United States Patent
Galloway

(10) Patent No.: US 11,601,691 B2
(45) Date of Patent: Mar. 7, 2023

(54) METHOD AND APPARATUS FOR PROVIDING AUDIO AND VIDEO WITHIN AN ACCEPTABLE DELAY TOLERANCE

(71) Applicant: Kilburn Live, LLC, Los Angeles, CA (US)

(72) Inventor: Vance William Galloway, Seattle, WA (US)

(73) Assignee: Kilburn Live, LLC, Los Angeles, CA (US)

( * ) Notice: Subject to any disclaimer, the term of this patent is extended or adjusted under 35 U.S.C. 154(b) by 0 days.

(21) Appl. No.: 17/307,900

(22) Filed: May 4, 2021

(65) Prior Publication Data
US 2021/0344973 A1    Nov. 4, 2021

Related U.S. Application Data

(60) Provisional application No. 63/020,005, filed on May 4, 2020.

(51) Int. Cl.
*H04N 21/232* (2011.01)
*H04N 21/4363* (2011.01)
(Continued)

(52) U.S. Cl.
CPC ......... *H04N 21/232* (2013.01); *H04N 21/218* (2013.01); *H04N 21/432* (2013.01); *H04N 21/4363* (2013.01)

(58) Field of Classification Search
CPC .. H04N 21/232; H04N 21/218; H04N 21/432; H04N 21/4363
See application file for complete search history.

(56) References Cited

U.S. PATENT DOCUMENTS 8,179,475 B2   5/2012   Sandrew
8,239,768 B2   8/2012   Sokol et al.
(Continued)

FOREIGN PATENT DOCUMENTS

CN   1213556 C     8/2005
CN   110140170 A   8/2019
(Continued)

OTHER PUBLICATIONS

Spiceworks, "Wifi at Drive-In Theater for Movie Audio Phone App." https://community.spiceworks.com/topic/2193674-wifi-at-drive-in-theater-for-movie-audio-phone-app, 7 pages.
(Continued)

*Primary Examiner* — Joshua D Taylor
(74) *Attorney, Agent, or Firm* — Patterson + Sheridan, LLP

(57) ABSTRACT

Certain aspects of the present disclosure provide techniques for delivering video and audio to one or more user devices. A method includes obtaining a video signal and an audio signal that are synchronized in time. The method includes applying a first time delay, greater than a predetermined maximum amount of time delay, to the video signal and outputting the delayed video signal to a display device. The method includes generating a plurality of copies of the audio signal and applying a plurality of time delays to the copies of the audio signal. A different time delay is applied to each of the plurality of copies of the audio signal and each of the plurality of time delays is smaller than the first time delay. The method includes outputting the plurality of delayed copies of the audio signal for broadcast to one or more user devices over a wireless network.

18 Claims, 8 Drawing Sheets

(51) Int. Cl.
*H04N 21/432* (2011.01)
*H04N 21/218* (2011.01)

(56) References Cited

U.S. PATENT DOCUMENTS

| | | | |
|---|---|---|---|
| 8,774,172 | B2 | 7/2014 | Morsy et al. |
| 8,958,742 | B2 | 2/2015 | Lee et al. |
| 9,894,319 | B2 | 2/2018 | Bychkov |
| 9,979,997 | B2 | 5/2018 | Schneider et al. |
| 10,230,996 | B1* | 3/2019 | Abreu ............... H04N 21/4884 |
| 10,250,927 | B2 | 4/2019 | Stewart |
| 10,404,974 | B2 | 9/2019 | Dietz et al. |
| 10,506,295 | B2 | 12/2019 | Chen et al. |
| 2010/0229211 | A1* | 9/2010 | Lee .................. H04N 21/6405 |
| | | | 725/109 |
| 2012/0154679 | A1 | 6/2012 | Pendarvis |
| 2012/0200774 | A1 | 8/2012 | Ehlers, Sr. |
| 2015/0281853 | A1 | 10/2015 | Eisner et al. |
| 2015/0296247 | A1 | 10/2015 | Glasser |
| 2016/0241902 | A1 | 8/2016 | Young et al. |
| 2018/0167149 | A1* | 6/2018 | Stilwell ............... H04L 65/4084 |
| 2019/0090028 | A1* | 3/2019 | Kirley ............... H04N 21/4126 |
| 2019/0132621 | A1 | 5/2019 | Shiber et al. |
| 2019/0363171 | A1 | 11/2019 | Marek et al. |

FOREIGN PATENT DOCUMENTS

| | | | |
|---|---|---|---|
| DE | 102014209518 | A1 | 11/2015 |
| JP | 2018074591 | A | 5/2018 |
| WO | 2006006980 | A2 | 1/2006 |
| WO | 2012049223 | A2 | 4/2012 |
| WO | 2013083133 | A1 | 6/2013 |
| WO | 2018172111 | A1 | 9/2018 |

OTHER PUBLICATIONS

Wireless Networks, "An adaptive delay and synchronization control scheme for Wi-Fi based audio/video conferencing," vol. 12, pp. 511-522 (2006). https://link.springer.com/article/10.1007/s11276-006-6549-7#main-content.
Liu, et al., "Towards the Delay and Synchronization Control for Networked Real-Time Multi-Object Multimedia Applications," 2003 The Ninth IEEE International Workshop on Object-Oriented Real-Time Dependable Systems, 2003, pp. 79-79.
M. Roccetti et al., "A software audio terminal for interactive communications in Web-based educational environments aver the Internet," IECON'99. Conference Proceedings. 25th Annual Conference of the IEEE Industrial electronics Society, 1999, pp. 100-105, vol. 1.
R. Mendes Costa Segundo et al., "Second screen event flow synchronization," 2013 IEEE International Symposium on Broadband Multimedia Systems and Broadcasting (BMSB), 2013, pp. 1-7.
Knigge et al., "Cinema and theatre: accessible entertainment with benefits for all," Universal Design 2014: Three Days of Creativity and Diversity, IOS Press, pp. 421-422.
Choi et al., "Robust Delay Control for Audio Streaming over Wireless Link," IEICE Transactions on Information and Systems, vol. E89-D, 2006, pp. 2448-2451.
Moon et al., "Packet audio playout delay adjustment: performance bounds and algorithms," Multimedia Systems, vol. 6, pp. 17-28.
University College Dublin, "Adaptive playout buffering for audio/video transmission over the internet," https://www.semanticscholar.org/paper/BUFFERING-FOR-AUDIO-%2F-VIDEO-TRANSMIS-SION-OVER-THE-Narbutt-Murphy/accOc0b01e6a49c619c550fee77dea7f1778c518?p2df.
Cooper, "Video-to-Audio Synchrony Monitoring and Correction," in SMPTE Journal, vol. 97, No. 9, pp. 695-698, Sep. 1988.
Kubota et al., "High-quality frame-synchronization for satellite video signal transmission," IEEE Transactions on Aerospace and Electronic Systems, vol. 31, No. 1, pp. 430-435, Jan. 1995.
Tucker, "Audio-to-Video Delay—Watermarking Provides a Means of Automatic Correction," SMPTE Journal, vol. 110, No. 8, pp. 523-526, Aug. 2001.
H. Jinzenji et al., "Real-time audio and video broadcasting of IEEE Globecom '96 over the Internet using new software," in IEEE Communications Magazine, vol. 35, No. 4, pp. 34-38, Apr. 1997.

* cited by examiner

METHOD AND APPARATUS FOR PROVIDING AUDIO AND VIDEO WITHIN AN ACCEPTABLE DELAY TOLERANCE

PRIORITY CLAIM(S)

This application claims benefit of and the priority to U.S. Provisional Application No. 63/020,005, filed on May 4, 2020, which is expressly incorporated by reference in its entirety as if fully set forth below and for all applicable purposes.

BACKGROUND

Field of the Disclosure

Aspects of the present disclosure relate to wireless communications, and more particularly, to techniques and apparatus for providing synchronized audio and video.

Description of Related Art

Conventionally, audio has been delivered via radio transmission (e.g., using amplitude modulation (AM) and/or frequency modulation (FM) radio frequencies) at drive-in cinemas. More recently, audio has been delivered via internet streaming. By way of example, for "pop-up" drive-in cinemas, users who attend the pop-up drive-in cinema watch a video that is displayed on a surface (e.g., projected on a screen, a wall, a ceiling, the side of a building, etc.) and the users listen to the accompanying audio through their user device, such as a cell phone, tablet, or other device with access to the network. The audio is streamed to individual users devices using Internet Protocol (IP) over a wireless network such as Wi-Fi or LTE (long term evolution). Streaming the audio has inherent delays, which may be due to hardware (e.g., different device models have different hardware capabilities and network compatibility) and/or software capabilities of the user device, the networking, the timing at which packets are sent to users, the location of the user devices, etc. The audio streaming delays may cause the audio to be out-of-sync with, or delayed from, the video. The delay experienced may also vary by user. The latency for a user device may also change over time. Any such delay may detract from the user's overall experience at the pop-up drive-in cinema.

Thus, techniques and apparatus for delivering synchronous audio and video within an acceptable delay tolerance are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved audio and video synchronization.

Aspects of the present disclosure provide techniques for delivering video and audio such that the displayed video is within an acceptable delay tolerance of the audio playing on a separate user device. In some examples, the video signal is delayed past a predetermined amount of delay, which may be a determined or predicted maximum latency for the user devices to receive the audio signal. Multiple copies of the audio signal are then generated and different delays are applied to each of the multiple copies. All of the delay copies of the audio signal are then broadcast to the users as multiple audio channels, also referred to herein as streams, over the wireless network. The user can then select, for example, from an application running on their user device, the audio channel that provides the best synchronization of the audio on their user device with the video being displayed on another device.

Certain aspects of the subject matter described in this disclosure can be implemented in a method for delivering video and audio. The method generally includes obtaining a video signal and an audio signal that are synchronized in time and applying a first time delay to the video signal. The first time delay is greater than a predetermined maximum amount of time delay. The method generally includes outputting the delayed video signal to a display device. The method generally includes generating a plurality of copies of the audio signal and applying a plurality of time delays to the plurality of the copies of the audio signal. A different time delay is applied to each copy of the plurality of copies of the audio signal and each time delay of the plurality of time delays is smaller than the first time delay applied to the video signal. The method generally includes outputting the plurality of delayed copies of the audio signal for broadcast to one or more user devices over a wireless network.

Certain aspects of the subject matter described in this disclosure can be implemented in a system for delivering video and audio. The system generally includes a media playback device configured to obtain a synchronized media signal includes a video signal and an audio signal that are synchronized in time, output the video signal to a video delay unit, and output the audio signal to an audio signal splitter. The system generally includes a video delay unit configured to apply a first time delay to the video signal. The first time delay is greater than a predetermined maximum amount of time delay. The video delay unit is configured to output the delayed video signal to a display device. The system generally includes the audio signal splitter configured to split the audio signal into a plurality of copies of the audio signal. The system generally includes a plurality of audio delay units configured to receive the plurality of copies of the audio signal and apply a plurality of time delays to the plurality of the copies of the audio signal. A different time delay is applied to each copy of the plurality of copies of the audio signal. Each of the plurality of time delays is smaller than the first time delay applied to the video signal. The audio delay units are configured to output the plurality of delayed copies of the audio signal for broadcast to one or more user devices over a wireless network.

Certain aspects of the subject matter described in this disclosure can be implemented in an apparatus for delivering video and audio. The apparatus generally includes a memory and one or more processors coupled with the memory. The memory and one or more processors are configured to obtain a synchronized media signal includes a video signal and an audio signal that are synchronized in time. The memory and one or more processors are configured to apply a first time delay to the video signal, the first time delay being greater than a predetermined maximum amount of time delay, and output the delayed video signal to a display device. The memory and one or more processors are configured to generate a plurality of copies of the audio signal and apply a plurality of time delays to the plurality of copies of the audio signal. A different time delay is applied to each copy of the plurality of copies of the audio signal and each of the plurality of time delays is smaller than the first time delay applied to the video signal. The memory and one or more processors are configured to output the plurality of delayed copies of the audio signal for broadcast to one or more user devices over a wireless network.

Certain aspects of the subject matter described in this disclosure can be implemented in an apparatus. The apparatus generally includes means for obtaining a video signal and an audio signal that are synchronized in time. The apparatus generally includes means for applying a first time delay to the video signal, the first time delay being greater than a predetermined maximum amount of time delay. The apparatus generally includes means for outputting the delayed video signal to a display device. The apparatus generally includes means for generating a plurality of copies of the audio signal. The apparatus generally includes means for applying a plurality of time delays to the plurality of copies of the audio signal. A different time delay is applied to each copy of the plurality of copies of the audio signal and each copy of the plurality of time delays is smaller than the first time delay. The apparatus generally includes means for outputting the plurality of delayed copies of the audio signal for broadcast to one or more user devices over a wireless network.

Certain aspects of the subject matter described in this disclosure can be implemented in a computer readable medium. The computer readable medium generally stores computer executable code thereon including code for obtaining a video signal and an audio signal that are synchronized in time. The computer readable medium generally stores computer executable code thereon including code for applying a first time delay to the video signal, the first time delay being greater than a predetermined maximum amount of time delay. The computer readable medium generally stores computer executable code thereon including code for outputting the delayed video signal to a display device. The computer readable medium generally stores computer executable code thereon including code for generating a plurality of copies of the audio signal. The computer readable medium generally stores computer executable code thereon including code for applying a plurality of time delays to the plurality of the copies of the audio signal. A different time delay is applied to each copy of the plurality of copies of the audio signal, and wherein each of the plurality of time delays is smaller than the first time delay. The computer readable medium generally stores computer executable code thereon including code for outputting the plurality of delayed copies of the audio signal for broadcast to one or more user devices over a wireless network.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

The following description provides examples of providing audio and video within an acceptable delay tolerance in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

Figure 1:
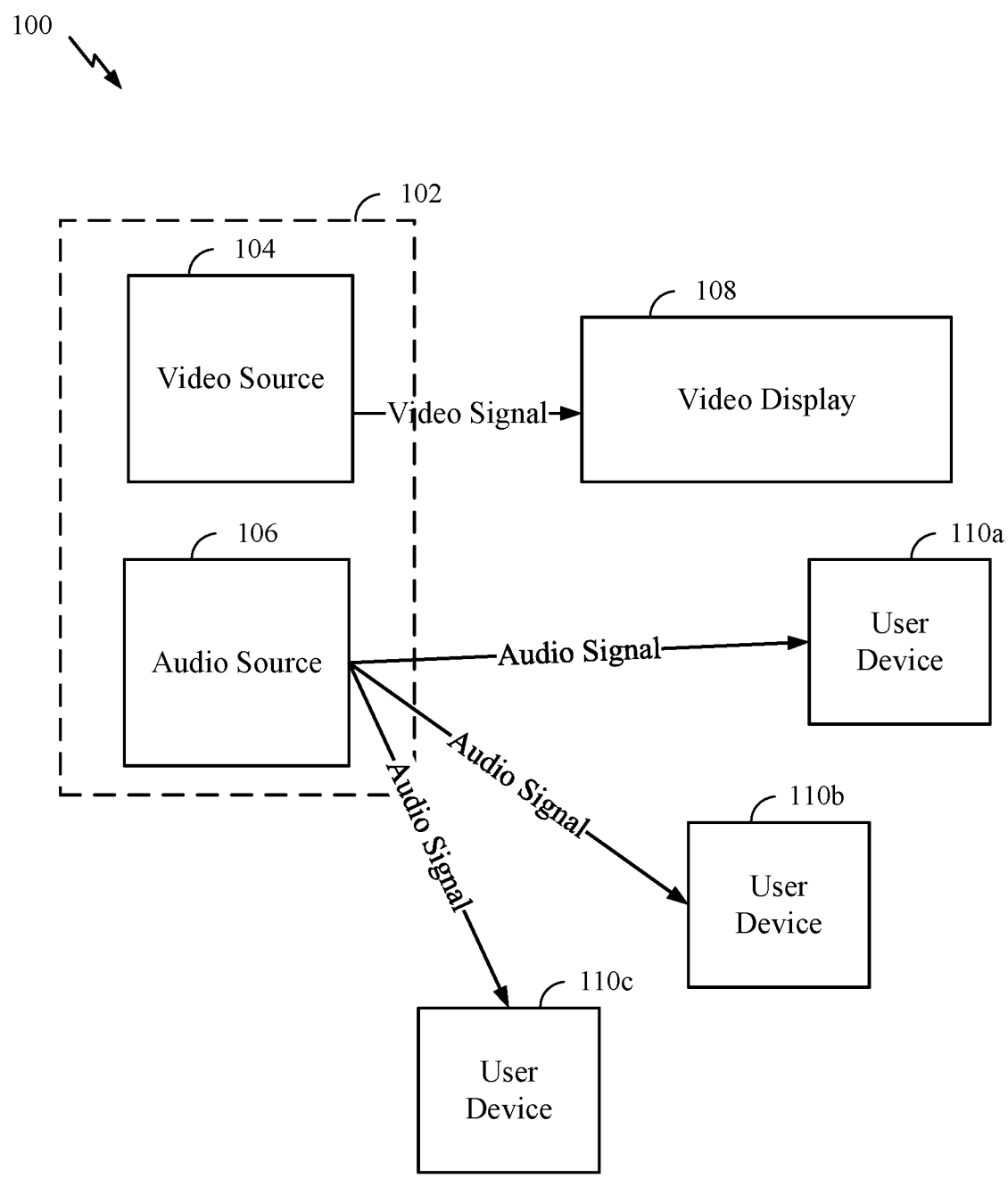
FIG. 1 is a block diagram conceptually illustrating an example media system, in accordance with certain aspects of the present disclosure.

FIG. 1 is a block diagram of an example media system 100. The media system 100 may include a media source 102. The media system 100 may have access to a synchronized audio/video (A/V) signal. For example, the media source 102 may include at least a video source 104 and an audio source 106, which can be a single A/V source. Alternatively, media system 100 may obtain the synchronized A/V signal from an external source.

An A/V signal may be obtained from any of a variety of sources, such as a television broadcast, a program, a movie, a multimedia computer file (e.g., JPEG, MPEG), streaming media, and/or other audio/video content or sources. An A/V signal may be transmitted over a communication system (e.g., broadcast television, cable television, satellite television, a computer network such as the Internet, etc.). An A/V signal may be stored for later playback (e.g., on a DVD, in computer memory, in external memory, in a digital video recorder, on a TV streaming device, etc.).

As shown in FIG. 1, in some systems such as media system 100, an A/V signal can be separated into a video signal and an audio signal and the video signal and the audio signal can be sent separately to different devices. For example, the A/V outputs from a media playback device may be separated into discrete video and audio channels. An audio channel may also be referred to herein as a stream, or audio stream. The video source 104 may be configured to output a video signal to a video display 108. The audio source 106 may be configured to output one or more audio signals to each of one or more user devices 110a, 110b, 110c. Although only three audio signals are shown, it should be understood that the audio source 106 may output more than (or fewer than) three audio signals for more than (or fewer than) three user devices.

A display device is a device that displays video (or any visual media). A display device may be a television, a monitor, a computer, a projector, a kiosk, a billboard, digital signage, a screen, or other type of display device. References herein to a specific type of display device in examples discussed below (e.g., a projector and screen) are not intended to limit any aspect of the present disclosure to that particular type of device.

A user device may include a mobile phone, a cellular phone, a smart phone, a personal digital assistant (PDA), a handheld device, a laptop computer, a cordless phone, a tablet computer, a camera, a gaming device, a netbook, a smartbook, an ultrabook, a wearable device such as a smart watch, smart glasses, a smart wrist band, an entertainment device (e.g., a music device, a video device, etc.), a vehicular component, or any other suitable device that is configured to communicate via a wireless or wired medium. References herein to a specific type of user device in examples discussed below (e.g., a phone or tablet) are not intended to limit any aspect of the present disclosure to that particular type of device.

The audio signals may be sent to the one or more user devices 110a, 110b, 110c over a wireless network. The wireless network could be any suitable network that encodes and packetizes (e.g., into separate IP steams) the audio signal for wireless transmission to the user devices. Some example wireless networks include cellular networks such as 3GPP Long Term Evolution (LTE), LTE-Advanced (LTE-A), 4G, 5G and wireless local area networks (WLANs) such as Wi-Fi (e.g., IEEE 802.11 networks).

As discussed above, streaming the audio to the one or more devices involves an inherent delay (e.g., due to transmission/processing times). The inherent delay may cause the audio to be out-of-sync with, or delayed from, the video. A lack of synchronization between the video and audio data streams can introduce differences in the timing of events in the video and audio content that are intended to occur simultaneously. If the difference in timing is great enough, the result can be distracting to a viewer and thus detract from the media experience.

The term "synchronized" is used herein to refer to a state in which audio and video streams are aligned in time to within a specified delay tolerance. For example, a delay tolerance may be specified as at or within the detectable human limit for perceiving synchronization errors (e.g., about 10-25 ms). The delay tolerance may vary depending on whether the audio is ahead of the video or is behind the video. For example, the delay tolerance may be higher for audio coming after the video than for audio coming before the video. For example, a user experience is more impacted by audio that comes before video, than audio that comes after video.

According to certain aspects, to provide users with video and audio within a delay tolerance, the video signal may be delayed past a predetermined maximum amount of delay. Multiple copies of the audio signal are generated with different delays that are each smaller than the delay applied to the video signal.

Figure 2:
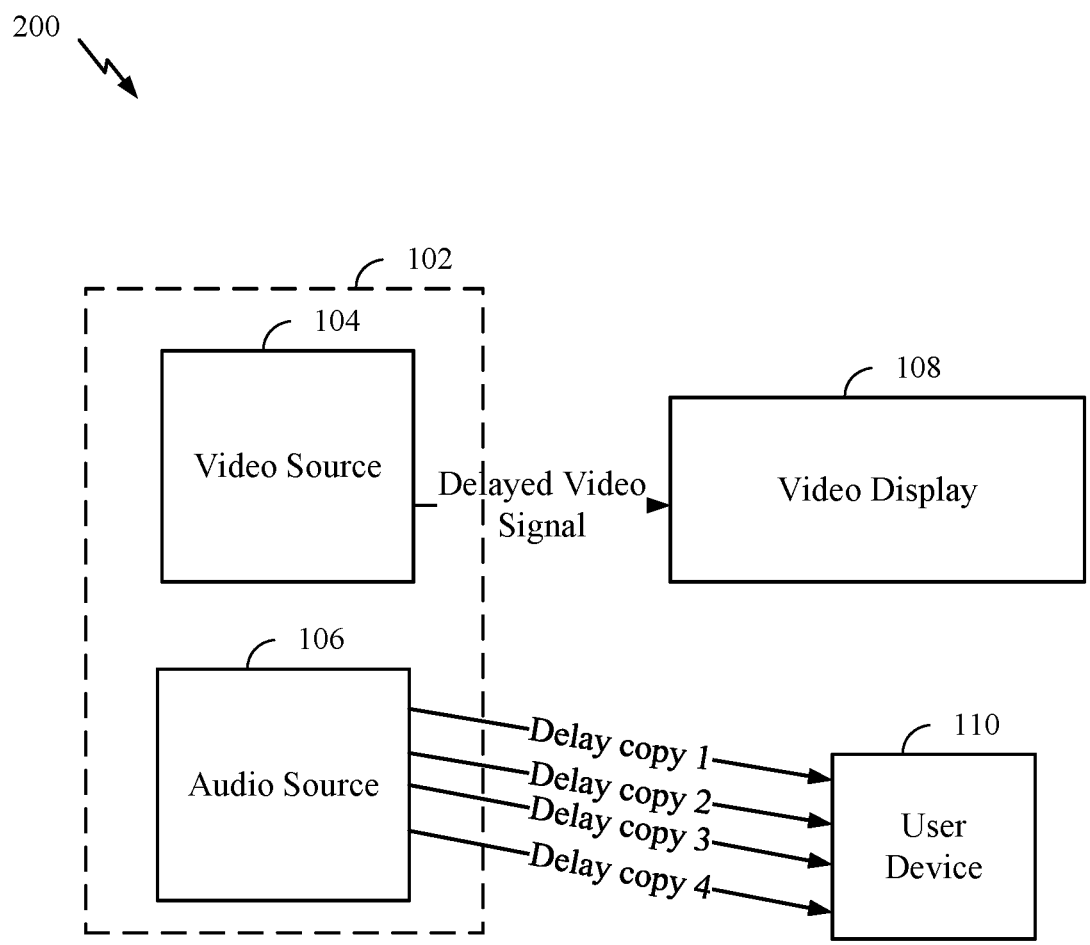
FIG. 2 is a block diagram conceptually illustrating an example of providing multiple delay copies of an audio signal to a user device, in accordance with certain aspects of the present disclosure.

FIG. 2 is a block diagram of an example media system 200 providing audio and video with a delay tolerance. As shown in FIG. 2, the media system 200 includes media source 102, video display 108, and at least one user device 110.

The video and audio are initially synchronized A/V content. The video source 104 may be configured to output a delayed video signal to the video display 108. The video signal may be delayed at or past a predetermined maximum amount of delay. For example, the predetermined maximum amount of delay maybe a maximum delay for the user device 110 to receive the audio signal, or a maximum latency associated with the user device 110. The predetermined maximum amount of delay may be determined by measurements taken from various user devices, calculations based on known sources of delay in the network, etc. Measurements can be made using devices of different models, different generations, different software, and/or different operating systems to measure the delays associated various devices. The predetermined maximum amount of delay may be based on calculations, predictions, or expected delays based on a model of the user device. The predetermined maximum amount of delay may be determined based on a largest expected total latency from among inherent latencies of user device models expected to be present, and known sources of delay in the network or networks being deployed.

The audio source 106 may configured to output one or more delay copies of an audio signal to the user device 110. For example, the audio signal can be split or copied to generate multiple copies of the audio signal. The copies of the audio signal can be delayed by different amounts. For example, a different time delay value is applied to each copy of the audio signal. The delayed copies of the audio signal may be referred to herein as "delay copies".

Although four delay copies (Delay copies 1-4) are shown in FIG. 2, the number of delay copies may be configurable. For example, more delay copies may allow more selections, and more granularity for synchronization, to the user; however, the use of additional delay copies involves higher overhead and cost. In some examples, the delay copies may have a granularity of about 30 ms (e.g., Delay copy 1 has a delay of 30 ms, Delay copy 2 has a delay of 60 ms, Delay copy 3 has a delay of 90 ms, and Delay copy 4 has a delay of 120 ms).

The time delays, the number of delay copies, and/or the granularity of the time delays applied to the delay copies, may be selected based on expected delays/latencies experienced by the user devices receiving the audio in the system. For example, the delays applied to the delays copies may be based on the most frequently experienced delays by the user devices. The delays/latencies associated with the users may be observed or may be estimated/predicted (e.g., based on the network conditions, user device models, software, etc.), as discussed in more detail below with respect to FIG. 5. The time delays, the number of delay copies, and/or the granularity of the time delays applied to the delay copies may be selected such that there is a high probability that, for each of the user devices 110, the time delay associated with at least one of the delay copies in addition to the inherent latency associated with the user device 110 (and network), aligns with the delayed video signal to within a specified tolerance. In this manner, each user device 110 can select a delay copy that results in an audio signal that is synchronized to the delays video signal being displayed on the video display 108.

The delay copies can be channelized and transmitted as different audio streams to the user devices 110. For example, the delays copies may be packetized and broadcast over a wireless network. Thus, each user device 110 may receive all of the delay copies. The users can then select the delay copy that provides the best synchronization of the audio on the user device to the video on the display. The delay copies may be presented to the user for selection, such as through a user interference (UI). For example, the delay copies may be presented to the user by an application (or "app") or website on the user device, as discussed in more detail below with respect to FIG. 6 and FIG. 8. The user may select a delay copy, via the UI, based on the variant of delay they are experiencing between the video and the audio.

In this way, by broadcasting the multiple delay copies, user devices with different delays can each select an appropriate to synchronize the audio and video signals within a delay tolerance.

An illustrative example of a use case for providing video and audio within a delay tolerance is a "pop-up" drive-in cinema. Users who attend the pop-up drive-in cinema watch a video that is projected onto a screen and listen to the accompanying audio through their user device (such as a phone, tablet, laptop computer, or another electronic device).

Figure 3:
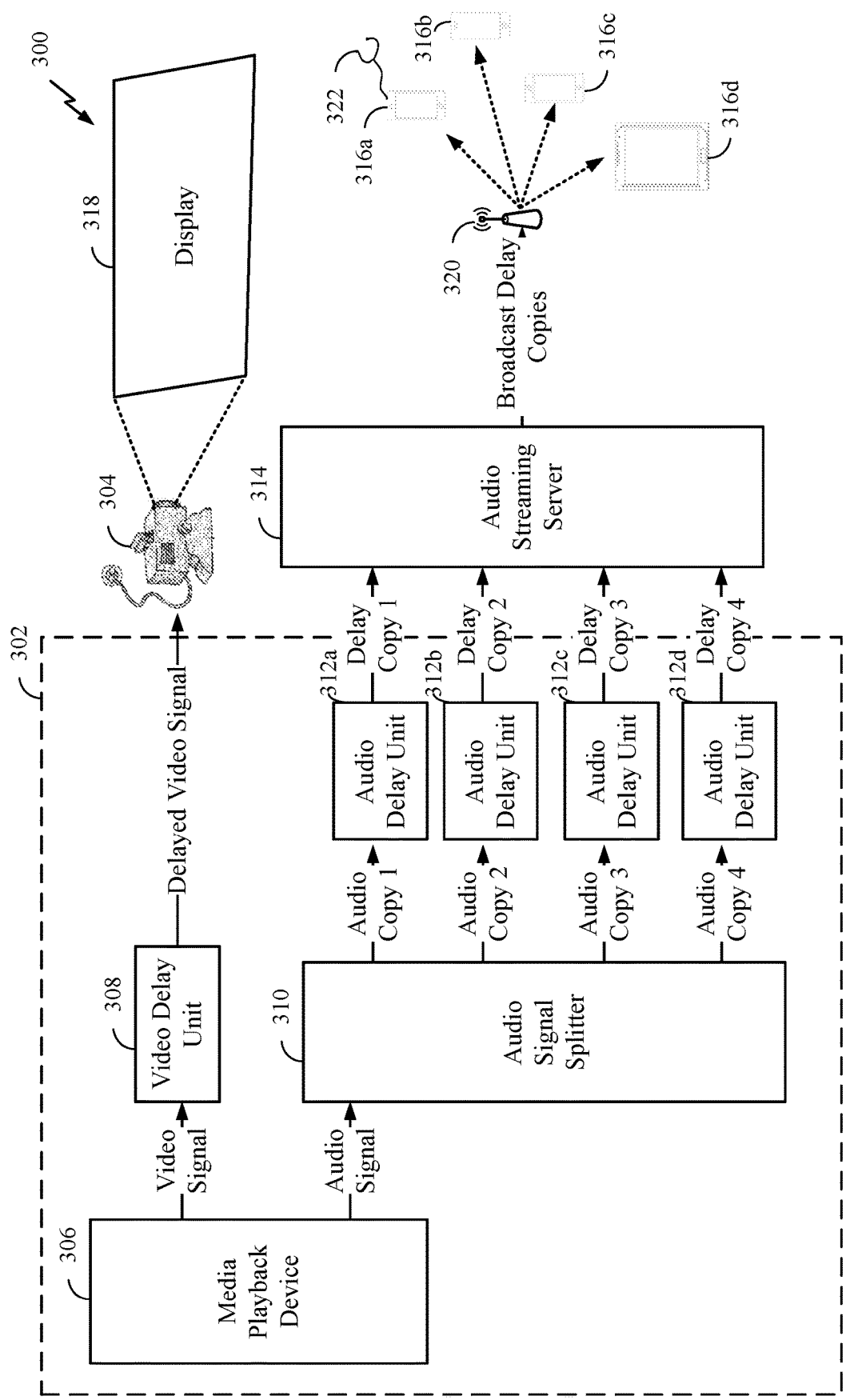
FIG. 3 is a block diagram conceptually illustrating an example media system providing multiple delay copies of an audio signal to a user device in an example pop-up cinema scenario, in accordance with certain aspects of the present disclosure.

FIG. 3 is a block diagram of an example media system 300 for providing video and audio within a delay tolerance, in accordance with aspects of the disclosure. The media system 300 may include a media source 302, a display 318, an audio streaming server 314, and user devices 316a-d (collectively referred to as user devices 316).

The media source 302 may include a media playback device 306, a video delay unit 308, an audio signal splitter 310, and audio delay units 312a-d. The media playback device 306 may have access to A/V media content (e.g., a movie). The media playback device 306 may be a DVD player, a Blu-Ray player, a computer, or the like. The media playback device 306 may separate the A/V media content into a video signal and an audio signal. The media playback device 306 may provide a video signal to a video delay unit 308 and an audio signal to an audio signal splitter 310.

The video delay unit 308 may be a video delay switch, a video delay circuit, a video delay chip, or any suitable video delay device. The video delay unit 308 may be configured to delay the video signal by a predetermined amount. For example, the video delay unit 308 may apply a time delay to the video signal at or past a pre-determined maximum amount. As discussed herein, the pre-determined maximum amount of delay may a largest delay that is observed, expected, or estimated to be experienced by the user devices 316 for receiving the audio signals. The video delay unit 308 provides the video signal to a display. The display may be any suitable display, such as a projector, a TV, a monitor, or the like. In the example shown in FIG. 3, the video delay unit 308 provides the video signal to a projector 304, which in turn may project a video onto a display 318.

The audio signal splitter 310 may be configured to generate a plurality of copies of the audio signal. The audio signal splitter 310 may include an input with multiple outputs. The audio signal splitter 310 may output the copies of the audio signal to the audio delay units 312a, 312b, 312c, 312d (collectively referred to herein as the audio delay units 312). The number of copies and the number of audio delay units may be configurable. For example, the number could be fewer than four or greater than four.

The audio delay units 312 may be configured to add (e.g., to apply) a time delay to the copies of the audio signal (e.g., to generate a "delay copy"). The audio delay units 312 may include audio delay processors and/or audio delay circuits with at least one delay buffer to delay an input signal. The audio delay units 312 may each be configured to have a tunable delay amount. Each of the audio delay units 312 may delay the received audio copy by a different amount. As discussed above, the number of audio delay units 312, the delay amounts, and/or the granularity of the delay amounts may be selected based on predicted, observed, or estimated (e.g., via calculation) latencies/delays associated with the user devices 316, such as the most frequently occurring latencies/delays or most likely to occur latencies/delays. As discussed in more detail with respect to FIG. 5, the delays may be selected such that for the latencies associated with the user devices 316, at least one of the delay amounts for audio in addition to the latency for the user device, corresponds to the video signal delay, such that the delayed audio signal and the delayed video signal are synchronized within a specified latency tolerance.

The audio delay units 312 may output the delays copies 1-4 to an audio streaming server 314. The audio streaming server 314 may be configured to send the delay copies 1-4 over a wireless network to the user devices 316. For example, the audio streaming server 314 may sends the delay copies 1-4 to the user devices via a Wi-Fi access point (AP) 320, a router, a modem, a WAN tower, and/or other network equipment. As discussed herein, the network may be any type of wireless network. The delay copies 1-4 may be packetized and broadcast (e.g., by a user datagram protocol (UDP)) as different audio channels to the user devices 316.

Users may then be able to watch the video content on the display 318 and listen to the corresponding audio on their respective user device 316. Because all of the delay copies are broadcast to each user device 316, the user can select the audio channel (i.e., stream) with the delayed audio that provides the best synchronization with the video on the display 318. As discussed in more detail below with respect to FIG. 6 and FIG. 8, the user devices 316 may include a UI (e.g., presented via an application on a user device) that presents selection options to the user for selecting the audio channel corresponding to the delay copy. In some examples, the UI may be provided by the audio streaming server 314 (e.g., an applications server). The user may listen to the selected audio using the speakers of the user device 316 or of another device 322 in connection with the user device, such as headphones, ear buds, a portable speaker, or other audio device which may be wired to a headphone jack of the user device or wireless connected via a near-field technology such as Bluetooth.

According to certain aspects, one or more of the components of the system shown in FIG. 3 may be combined in a single unit, such as a computer. For example, the media source 302 shown in FIG. 3 may be configured as a single computing device. In some examples, hardware components shown in FIG. 3 may be implemented via software on the computing device.

Computer program logic implementing all or part of the functionality described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Figure 4:
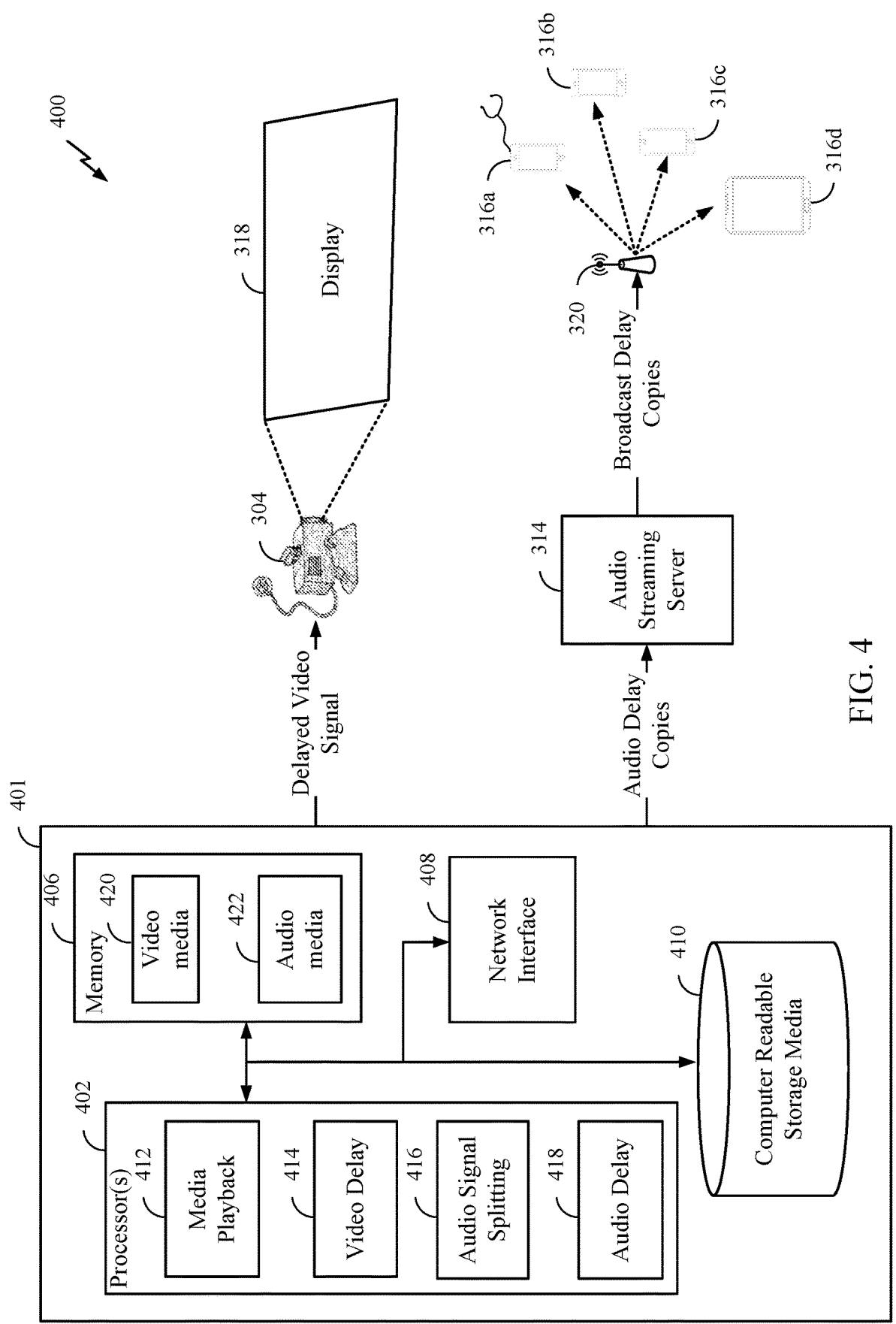
FIG. 4 is a block diagram conceptually illustrating an example media system providing multiple delay copies of an audio signal to a user device in the example pop-up cinema scenario with multiple components combined in a single computing device, in accordance with certain aspects of the present disclosure.

As shown in media system 400 of FIG. 4, a media source 401 may include processor(s) 402, a memory 406, a network interface 408, and computer readable storage media 410.

The processor(s) 402 may have circuitry (e.g., microprocessor(s)) configured to execute code stored in the computer readable storage media 410. The processor(s) 402 may include processor/circuitry for media playback 412, processor/circuitry for video delay 414, processor/circuitry for audio signal splitting 416, and processor/circuitry for audio delay processor 418. The processor/circuitry for media playback 412 may be configured to perform the functions of the media playback device 306. The processor/circuitry for video delay 414 may be configured to perform the functions of the video delay unit 308. The processor/circuitry for audio signal splitting 416 may be configured to perform the functions of the audio signal splitter 310. The processor/circuitry for audio delay processor 418 may be configured to perform the functions of the audio delay units 312a-d.

The memory 406 can store the video media 420 and the audio media 422. Alternatively, the media source 401 may be configured to stream the video and audio media from a network, read the video and audio media from a disk or external storage device (e.g., an external hard drive), or the like.

The network interface 408 may be configured to obtain the video and audio media content. The network interface 408 may be configured to provide the audio content to the audio streaming server 314. Alternatively, the media source 302 may have a wired connection to the audio streaming server 314. Alternatively, the media source 302 may also include the functionalities of the audio streaming server 314 and may provide the audio delay copies to the network for broadcast to the user devices 316.

Wired video connections may include HDMI, component, composite, S-video, DVI, coaxial, or other interface. Wired audio connections may include Audio Engineering Society (AES) Digital Audio, Balanced or Unbalanced analog audio, or transported on wired network based formats including, but not limited to, AES50, AVS, or Dante.

Figure 5:
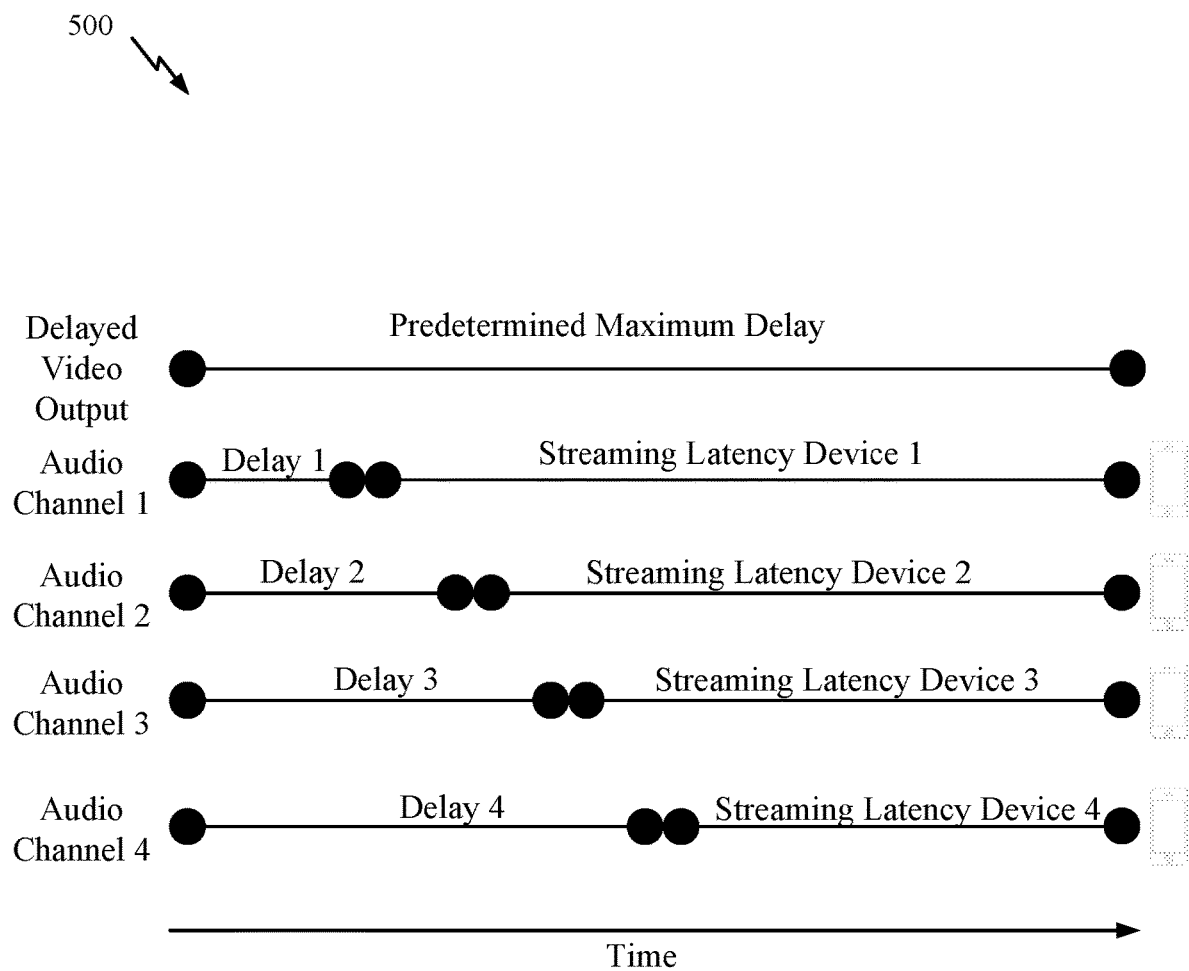
FIG. 5 is an example timing diagram of synchronized audio and video for multiple user devices, in accordance with aspects of the present disclosure.

FIG. 5 is a timing diagram 500 illustrating audio and video synchronization within a delay tolerance according to aspects of the present disclosure. As shown in FIG. 5, the video signal may be delayed by a predetermined amount to generate a delayed video output. As discussed above, the predetermined amount to delay the video may be determined based on an expected maximum delay for user devices to receive and output the audio signal to a user, due to the inherent latencies associated with streaming the audio.

As shown in the FIG. 5, different user devices, such as devices 1-4, may have different inherent latencies (e.g., due to conditions within the network, proximity to a server, internal processing speed, hardware capabilities, etc.), shown as streaming latency device 1, streaming latency device 2, streaming latency device 3, and streaming latency device 4. Thus, it may be advantageous to provide (and for the user to select) an audio channel with a delay copy that has an appropriate amount of delay, such that the total amount of delay from the delay copy in addition to the inherent latency experienced at the user device is within a delay tolerance of the delayed video signal. As shown in the example in FIG. 5, four delay copies of the audio may be broadcast to the users with different amounts of delay—audio channel 1 with delay 1, audio channel 2 with delay 2, audio channel 3 with delay 3, and audio channel 4 with delay 4. For a user device with a large inherent latency, such as Device 1, the user may select the audio channel with the smallest delay, audio channel 1, such that the inherent streaming latency for device 1 and the applied delay 1 is synchronized (e.g., within the specified maximum delay tolerance) to the delayed video output signal. The Device 4 with the smallest inherent streaming latency may select the audio channel 4 that has the largest applied delay, delay 4, such that with the inherent stream latency of device 4 and the applied delay 4, the audio is synchronized to the delayed video output signal, as shown in FIG. 5. If the user selects an audio channel and does not experience sufficient video-audio synchronization, then the user may select a different audio channel.

Figure 6:
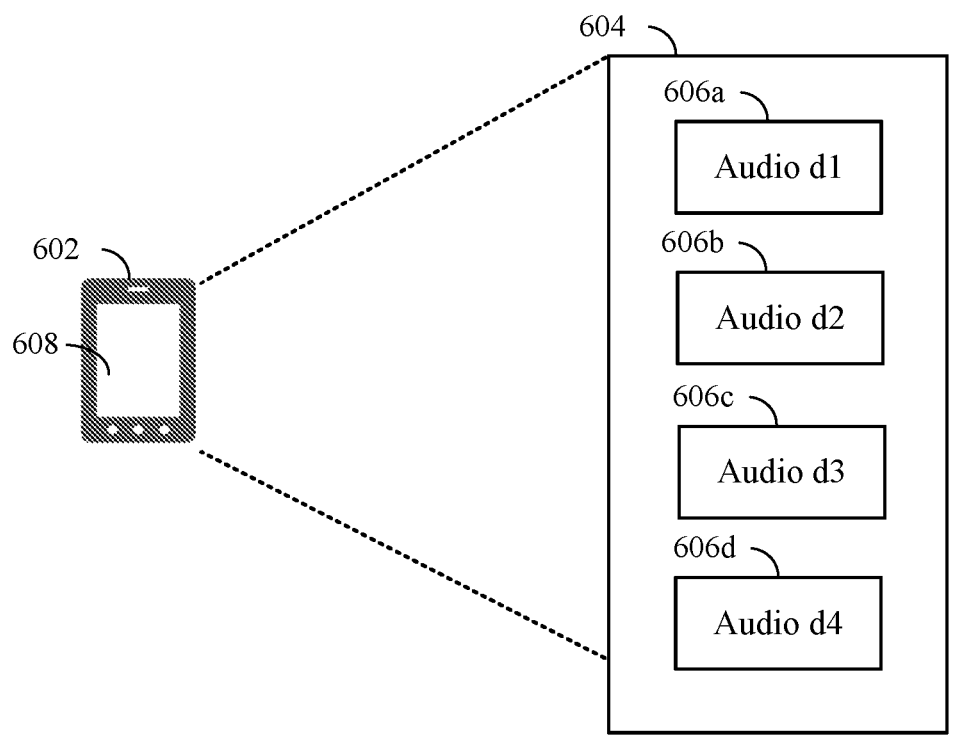
FIG. 6 is an example user interface for audio channel selection of an audio delay copy for synchronized audio and video, in accordance with aspects of the present disclosure.

FIG. 6 is a block diagram illustrating an example user interface (UI) on a user device 602. The user device may include a screen 608 configured to display a UI 604. For example, the user device 602 may include application software, or a webpage, that provides the UI (e.g., in association with an application server or Internet server). The UI 604 may provide the user with an array of options to select from, corresponding to the plurality of audio channels associated with the different delay copies. Referring back to the example audio channels provide in FIG. 5, the UI 604 may display a selection for the audio channel with the audio delay d1 606a, the audio channel with the audio delay d2 606b, the audio channel with the audio delay d3 606c, and the audio channel with the audio delay d3 606d (together referred to as channels 606). The user may then select one of the audio channels 606 presented in the UI 604.

The use of four audio channels, as shown in FIG. 6, is merely illustrative, the number of audio channels may be fewer or greater than four. Also, there are numerous manners in which the UI may present the selections to the user. In certain aspects, the audio channel selections may be represented as generic and/or relative terms, such as a descriptor of the delay within each channel. For example, an audio channel with the lowest delay amount may be presented as "less delay," while the audio channel with the highest delay amount may be presented as "more delay." In examples with multiple audio channels 606 available for the user's selection (e.g., four or more channels), the user may be presented with a range of options such as "low delay," "some delay,"

"above average delay," or "large delay," to correspond with the channels 606*a-d*, respectively.

The delays (e.g., d1, d2, . . . , dN) associated with the audio channels may be configurable. For example, each of the audio channels 606 may be offset by 30 ms from one another. That is, the lowest delay may be T ms, the second lowest delay may be T+30 ms, the third lowest delay may be T+60 ms, etc. 30 ms is one example of a granularity between the delays, the granularity can be larger or smaller. In some examples, the different delays may not be equally spaced apart. As discussed above, the delays may be selected based on observed or predicted latencies for the user devices to receive the audio signals.

In certain aspects, when provided with multiple audio channel options, the audio channels 606 may be represented by any acceptable relative terminology such that the user is able to distinguish between the multiple audio channels and select an appropriate audio channel with acceptable delay. The audio channels 606 may be presented to the user in a variety of fashions and arrangements. For example, the audio channels 606 may be presented in a row, column, table, or any suitable arrangement in the UI 604. In certain aspects, the arrangement of the presentation of the audio channels 606 may depend on the number of available audio channels for the user's selection.

For some aspects, the UI 604 may provide a suggested/recommended audio channel for the user to select. The suggested audio channel may be determined by a media system, as described above, by calculating an expected and/or likely latency that a particular user device may experience. The suggestion may be presented to the user on the UI 604 as an image, or an explicit preconfigured selection. In certain aspects, the suggestion may be an initial (or default) setting of the UI 604 when the user is first provided the options. If the user desires to select a different audio channel, before or after selecting the suggested audio channel, the user may still be free to reselect another audio channel with a different delay.

Figure 7:
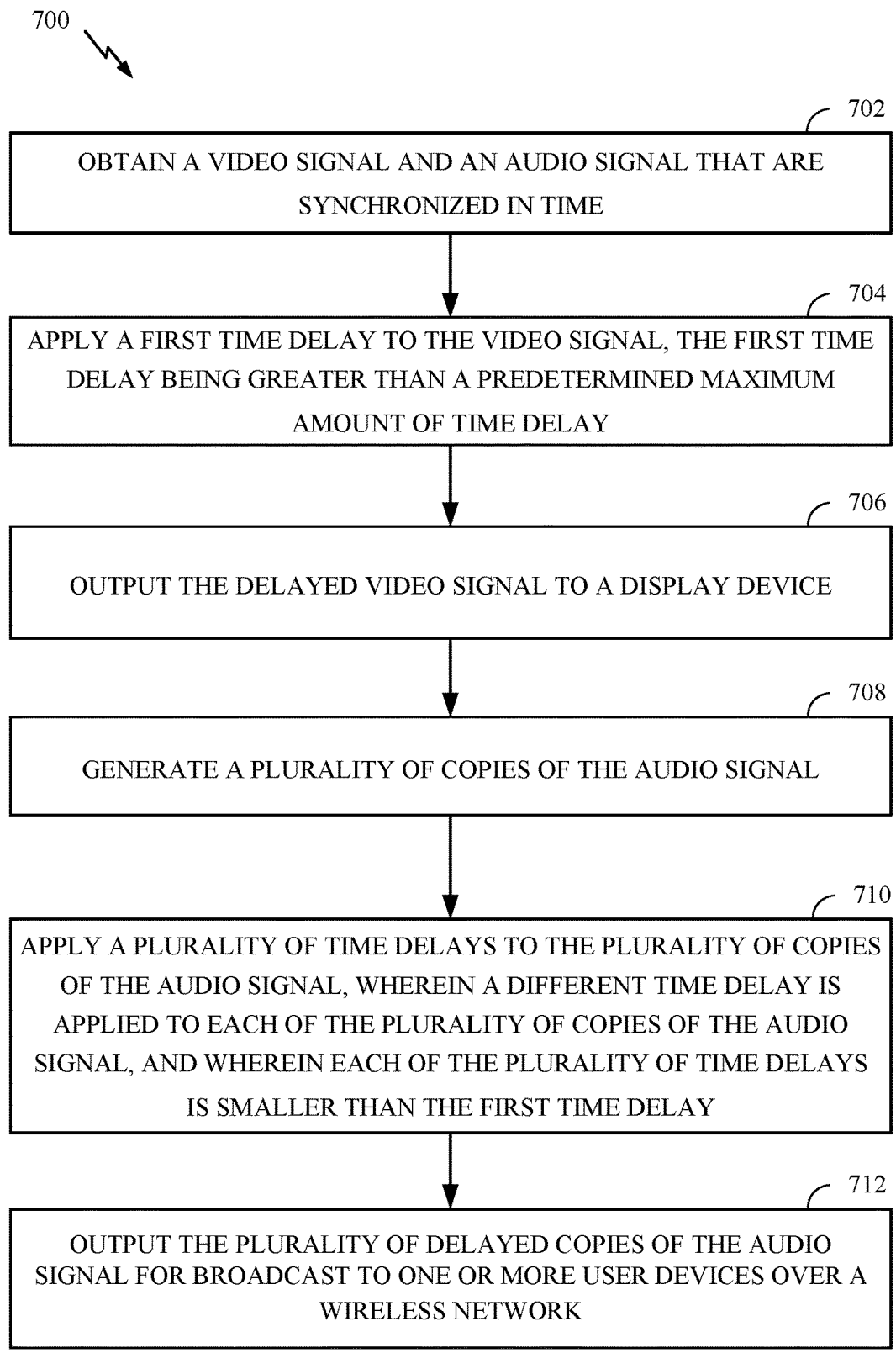
FIG. 7 is a flow diagram illustrating example operations for providing synchronized audio and video, in accordance with certain aspects of the present disclosure.

FIG. 7 is a flow diagram of example operations 700 for delivering video and audio to one or more user devices. The operations 700 may be performed by a media system (e.g., the media system 200 of FIG. 2 and/or the media system 300 of FIG. 3).

The operations 700 begin at 702, by obtaining a video signal and an audio signal that are synchronized in time. At 704, the method includes applying (e.g., by the video delay unit 308) a first time delay to the video signal, the first time delay being greater than a predetermined maximum amount of time delay. In certain aspects, the maximum amount of delay is a largest estimated amount of latency for the one or more user devices to receive the audio signal over the wireless network. At 706, the method includes outputting (e.g., by the projector 304) the delayed video signal to a display (e.g., the display 318).

At 708, the method includes generating (e.g., by the audio signal splitter 310) a plurality of copies of the audio signal. At 710, the method includes applying (e.g., by the audio delay units 312) a plurality of time delays to the plurality of copies of the audio signal, wherein a different time delay is applied to each of the plurality of copies of the audio signal, and wherein each of the plurality of time delays is smaller than the first time delay. In certain aspects, the predetermined maximum amount of time delay may be a highest amount of latency among expected latencies for the one or more user devices to receive an audio signal over the wireless network and output the audio signal to a user. In this case, the plurality of time delays may be selected based on the expected latencies for the one or more user devices to receive the audio signal over the wireless network and output the audio signal to the user.

At 712, the media system outputs the plurality of delayed copies of the audio signal for broadcast to one or more user devices over a wireless network. In certain aspects, the method may further include presenting the plurality of delayed copies of the audio signal for selection by a user via a user interface on each of the one or more user devices. In this case, the delayed copies may be presented for selection by a user based on an amount of delay experienced by the user between the video and audio. For example, a user may experience a delay in the audio based on a number of factors, and, based on the delay experienced or perceived, the user may decide which audio signal mitigates such delay.

Figure 8:
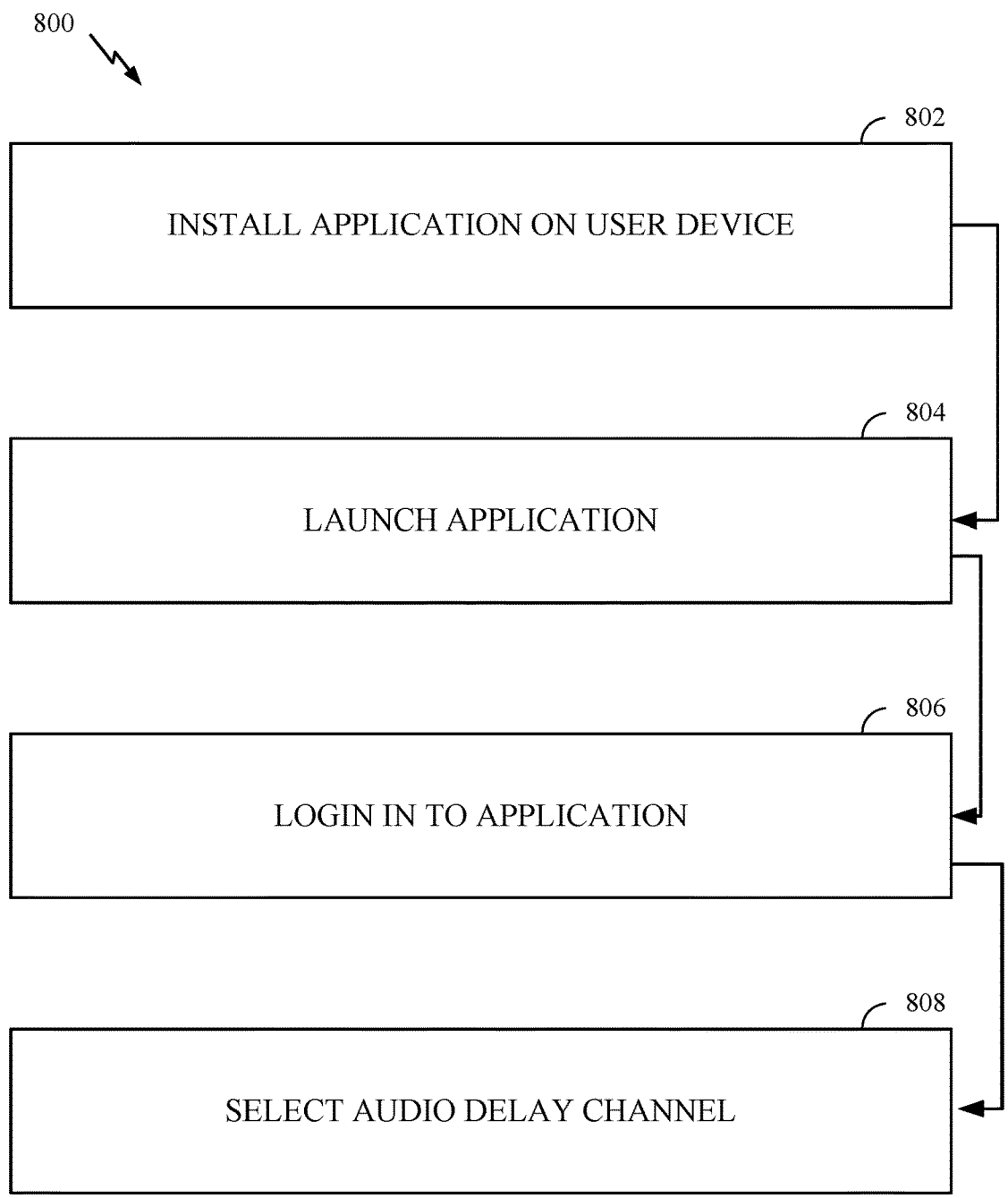
FIG. 8 is a flow diagram illustrating example operations for providing a user interface for synchronized audio and video, in accordance with certain aspects of the present disclosure.

As discussed above, a UI generated via an app on the user device may be used to select the audio delay channel. FIG. 8 is a flow diagram of example operations 800 for synchronizing video and audio on one or more user devices. The operations 800 may be performed at the user device.

At 802, the user device installs an application on the user device. For example, the application may be an audio streaming application. The user may download the audio streaming application from a content server, such as an "app store." The app may include software stored on the user device that may communicate with an applications server, such as the audio streaming server. Once downloaded, the series of information or screens presented to the users through the user devices may depend on the design choices of the makers of the application.

At 804, the user device logs in to the application. The logging into the application may be accomplished by launching the application from a home page of the user device (e.g., by pressing a physical or digital "button" or icon, by voice command, etc.) and logging in (e.g., using a password or other key) at an initial user interface within the application. Logging in to the application may connect the user device with the application server.

Optionally, the user device may be given a prompt to pay for the media content (e.g., the audio for the video content being displayed). In certain aspects, payment for the movie may include paying electronically and receiving a virtual ticket stub, which may be used to validate the user's reception of audio for the corresponding movie. That is, a user may be given access to audio of a movie once the user purchases a ticket for the movie.

At 806, the user device selects an audio stream. In certain aspects, the selection of the audio stream may be based on any delay experienced/perceived between the video and the audio of the movie. The user may select an audio stream to mitigate the perceived delay to allow the video and audio to be substantially synchronized. In certain aspects, a user's device, the device location, internal factors within the device, or any other suitable factor may contribute to the overall delay between the audio and video experienced by the user. The user may reselect a different audio stream based on preferences, changes in network connection, or any other factors that may alter the user's experience or perception of delay between the video and audio. In some examples, the user may be provided with a suggested or default audio channel.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. In addition, "determining" may include receiving (e.g., receiving information), accessing (e.g., accessing data in a memory) and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user device, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 7 and/or FIG. 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method for delivering video and audio, comprising:
   obtaining a video signal and an audio signal that are synchronized in time;
   applying a first time delay to the video signal, the first time delay being greater than a predetermined maximum amount of time delay;
   outputting the delayed video signal to a display device;
   generating a plurality of copies of the audio signal;
   applying a plurality of time delays to the plurality of copies of the audio signal, wherein a different time delay is applied to each copy of the plurality of copies of the audio signal, and wherein each of the plurality of time delays is smaller than the first time delay applied to the video signal; and
   broadcasting each of the plurality of delayed copies of the audio signal concurrently to each of one or more user devices via a wireless network.

2. The method of claim 1, wherein the predetermined maximum amount of time delay comprises a highest amount of latency among expected latencies for the one or more user devices to receive an audio signal over the wireless network and output the audio signal to a user.

3. The method of claim 1, wherein the plurality of time delays are selected based on expected latencies for the one or more user devices to receive the audio signal over the wireless network and output the audio signal to a user.

4. The method of claim 1, wherein the plurality of delayed copies of the audio signal are output for broadcast to each of the one or more user devices as a plurality of audio streams.

5. The method of claim 1, further comprising presenting the plurality of delayed copies of the audio signal for selection by a user via a respective user interface on each of the one or more user devices.

6. The method of claim 1, wherein the plurality of time delays are selected such that at least one of the delayed copies of the audio signal provides an amount of delay between the audio signal and the video signal experienced by users of the one or more user devices is within a specified delay tolerance.

7. A system for delivering video and audio, comprising:
   a media playback device configured to:
      obtain a synchronized media signal comprising a video signal and an audio signal that are synchronized in time;
      output the video signal to a video delay unit; and
      output the audio signal to an audio signal splitter;
   the video delay unit configured to:
      apply a first time delay to the video signal, the first time delay being greater than a predetermined maximum amount of time delay; and
      output the delayed video signal to a display device;
   the audio signal splitter configured to:
      split the audio signal into a plurality of copies of the audio signal; and
   a plurality of audio delay units configured to:
      receive the plurality of copies of the audio signal;
      apply a plurality of time delays to the plurality of copies of the audio signal, wherein a different time delay is applied to each copy of the plurality of copies of the audio signal, and wherein each of the plurality of time delays is smaller than the first time delay applied to the video signal; and
      broadcast each of the plurality of delayed copies of the audio signal concurrently to each of one or more user devices via a wireless network.

8. The system of claim 7, wherein the predetermined maximum amount of time delay comprises a highest amount of latency among expected latencies for the one or more user devices to receive an audio signal over the wireless network and output the audio signal to a user.

9. The system of claim 7, wherein the plurality of time delays are selected based on expected latencies for the one or more user devices to receive the audio signal over the wireless network and output the audio signal to a user.

10. The system of claim 7, further comprising:
    an audio streaming server configured to:
       obtain the plurality of delayed copies of the audio signal; and broadcast the plurality of delayed copies of the audio signal as a plurality of audio streams via the wireless network to each of the one or more user devices.

11. The system of claim 10, wherein:
the audio streaming server is configured to packetize the plurality of delayed copies of the audio signal; and
the wireless network comprises a wireless local area network or a wireless wide area network.

12. The system of claim 7, further comprising:
a server configured to provide a user interface on each of the one or more user devices, wherein the user interface configured to:
present selections to a user of the user device, the selections associated with the plurality of delayed copies of the audio signal; and
accept input from the user, the input comprising a selection one of the plurality of delayed copies of the audio signal.

13. The system of claim 7, wherein the plurality of time delays are selected such that at least one of the delayed copies of the audio signal provides an amount of delay between the audio signal and the video signal experienced by users of the one or more user devices is within a specified delay tolerance.

14. An apparatus for delivering video and audio, comprising:
a memory;
one or more processors coupled with the memory and configured to:
obtain a media signal comprising a video signal and an audio signal that are synchronized in time;
apply a first time delay to the video signal, the first time delay being greater than a predetermined maximum amount of time delay;
generate a plurality of copies of the audio signal; and
apply a plurality of time delays to the plurality of copies of the audio signal, wherein a different time delay is applied to each copy of the plurality of copies of the audio signal, and wherein each of the plurality of time delays is smaller than the first time delay applied to the video signal; and
a network interface configured to:
output the delayed video signal to a display device; and
broadcast each of the plurality of delayed copies of the audio signal concurrently to each of one or more user devices via a wireless network.

15. The apparatus of claim 14, wherein the predetermined maximum amount of time delay comprises a highest expected amount of latency among latencies for the one or more user devices to receive an audio signal over the wireless network and output the audio signal to a user.

16. The apparatus of claim 14, wherein the plurality of time delays are selected based on expected latencies for the one or more user devices to receive the audio signal over the wireless network and output the audio signal to a user.

17. The apparatus of claim 14, wherein the plurality of delayed copies of the audio signal are broadcast to each of the one or more user devices as a plurality of audio streams.

18. The apparatus of claim 14, wherein:
the network interface is further configured to provide a user interface on each of the one or more user devices; and
the user interface is configured to:
present selections to a user of the user device, the selections associated with the plurality of delayed copies of the audio signal; and
accept input from the user, the input comprising a selection one of the plurality of delayed copies of the audio signal.

* * * * *